(12) United States Patent
Minami

(10) Patent No.: US 11,481,160 B2
(45) Date of Patent: Oct. 25, 2022

(54) MANAGEMENT APPARATUS AND TERMINAL APPARATUS

(71) Applicant: FUJIFILM Business Innovation Corp., Tokyo (JP)

(72) Inventor: Yoshitomo Minami, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 229 days.

(21) Appl. No.: 16/744,121

(22) Filed: Jan. 15, 2020

(65) Prior Publication Data

US 2020/0310699 A1    Oct. 1, 2020

(30) Foreign Application Priority Data

Apr. 1, 2019   (JP) .............. JP2019-069741

(51) Int. Cl.
  *G06F 3/12*    (2006.01)
(52) U.S. Cl.
  CPC .......... *G06F 3/1204* (2013.01); *G06F 3/1262* (2013.01); *G06F 3/1288* (2013.01)
(58) Field of Classification Search
  None
  See application file for complete search history.

(56) References Cited

U.S. PATENT DOCUMENTS

| | | | | |
|---|---|---|---|---|
| 2016/0004492 A1* | 1/2016 | Lin | ............... | G06F 3/1239 358/1.13 |
| 2016/0042257 A1* | 2/2016 | Kim | ............... | G06F 3/1292 358/1.15 |
| 2018/0013916 A1* | 1/2018 | Koujimoto | ......... | H04N 21/858 |

FOREIGN PATENT DOCUMENTS

| | | |
|---|---|---|
| JP | 2008117349 | 5/2008 |
| JP | 2013196498 | 9/2013 |

\* cited by examiner

*Primary Examiner* — Frantz Bataille
(74) *Attorney, Agent, or Firm* — JCIPRNET

(57) ABSTRACT

A management apparatus includes a registration section that registers plural pieces of printing data related to a printing request by a user based on data received from a terminal apparatus of the user, a generation section that groups printing data which has identical or similar printing data characteristics to generate group identification information, a receiving section that receives the group identification information from a printing apparatus, and a providing section that provides the printing apparatus with the plural pieces of printing data which belong to a group identified by the group identification information received by the receiving section.

18 Claims, 14 Drawing Sheets

FIG. 4A

| No. | PRINTING DATA CHARACTERISTICS | | | RESERVATION NUMBER | | | | |
|---|---|---|---|---|---|---|---|---|
| | REGISTERED TIME AND DATE | SHEET SIZE | FILENAME EXTENSION | INDIVIDUAL | G1 | G2 | G3 | G4 |
| 1 | 11/26/2018 19:30 | POST CARD | JPEG | 1111 | – | – | – | – |

FIG. 4B

| No. | PRINTING DATA CHARACTERISTICS | | | RESERVATION NUMBER | | | | |
|---|---|---|---|---|---|---|---|---|
| | REGISTERED TIME AND DATE | SHEET SIZE | FILENAME EXTENSION | INDIVIDUAL | G1 | G2 | G3 | G4 |
| 1 | 11/26/2018 19:30 | POST CARD | JPEG | 1111 | 1122 JPG | – | – | – |
| 2 | 11/26/2018 19:45 | POST CARD | JPEG | 2222 | – | – | – | – |

FIG. 4C

| No. | PRINTING DATA CHARACTERISTICS | | | RESERVATION NUMBER | | | | |
|---|---|---|---|---|---|---|---|---|
| | REGISTERED TIME AND DATE | SHEET SIZE | FILENAME EXTENSION | INDIVIDUAL | G1 | G2 | G3 | G4 |
| 1 | 11/26/2018 19:30 | POST CARD | JPEG | 1111 | 1122 HAG | | — | — |
| 2 | 11/26/2018 19:45 | POST CARD | JPEG | 2222 | | 1233 JPG | — | — |
| 3 | 11/27/2018 10:00 | PHOTOGRAPHIC PRINT SIZE L | JPEG | 3333 | — | | — | — |

FIG. 4D

| No. | PRINTING DATA CHARACTERISTICS ||| RESERVATION NUMBER ||||
|---|---|---|---|---|---|---|---|
| | REGISTERED TIME AND DATE | SHEET SIZE | FILENAME EXTENSION | INDIVIDUAL | G1 | G2 | G3 | G4 |
| 1 | 11/26/2018 19:30 | POST CARD | JPEG | 1111 | 1122 HAG | | – | – |
| 2 | 11/26/2018 19:45 | POST CARD | JPEG | 2222 | | 1234 JPG | – | – |
| 3 | 11/27/2018 10:00 | PHOTOGRAPHIC PRINT SIZE L | JPEG | 3333 | 3344 LBA | | – | – |
| 4 | 11/27/2018 10:22 | PHOTOGRAPHIC PRINT SIZE L | JPEG | 4444 | | | – | – |

FIG. 4E

| No. | PRINTING DATA CHARACTERISTICS | | | INDIVIDUAL | RESERVATION NUMBER | | | |
|---|---|---|---|---|---|---|---|---|
| | REGISTERED TIME AND DATE | SHEET SIZE | FILENAME EXTENSION | | G1 | G2 | G3 | G4 |
| 1 | 11/26/2018 19:30 | POST CARD | JPEG | 1111 | 1122 HAG | – | | |
| 2 | 11/26/2018 19:45 | POST CARD | JPEG | 2222 | | – | 1234 JPG | |
| 3 | 11/27/2018 10:00 | PHOTOGRAPHIC PRINT SIZE L | JPEG | 3333 | 3344 LBA | | | |
| 4 | 11/27/2018 10:22 | PHOTOGRAPHIC PRINT SIZE L | JPEG | 4444 | | 3455 DAT | | |
| 5 | 11/27/2018 10:30 | A4 | PDF | 5555 | – | | – | 12345 ALL |

FIG. 4F

| No. | PRINTING DATA CHARACTERISTICS ||| RESERVATION NUMBER ||||
| | REGISTERED TIME AND DATE | SHEET SIZE | FILENAME EXTENSION | INDIVIDUAL | G1 | G2 | G3 | G4 |
| --- | --- | --- | --- | --- | --- | --- | --- | --- |
| 1 | 11/26/2018 19:30 | POST CARD | JPEG | 1111 | 1122 HAG | - | | |
| 2 | 11/26/2018 19:45 | POST CARD | JPEG | 2222 | | - | 1234 JPG | |
| 3 | 11/27/2018 10:00 | PHOTOGRAPHIC PRINT SIZE L | JPEG | 3333 | 3344 LBA | | | |
| 4 | 11/27/2018 10:22 | PHOTOGRAPHIC PRINT SIZE L | JPEG | 4444 | | 3455 DAT | | 123456 ALL |
| 5 | 11/27/2018 10:30 | A4 | PDF | 5555 | - | - | - | |
| 6 | 11/28/2018 9:32 | A3 | DOC | 6666 | - | - | - | |

FIG. 5

| No. | PRINTING DATA CHARACTERISTICS ||| RESERVATION NUMBER ||||
| | REGISTERED TIME AND DATE | SHEET SIZE | FILENAME EXTENSION | INDIVIDUAL | G1 | G2 | G3 | G4 |
| --- | --- | --- | --- | --- | --- | --- | --- | --- |
| 1 | 11/26/2018 19:30 | POST CARD | JPEG | 1111 | ~~1122 HAG~~ | – | – | – |
| 2 | 11/26/2018 19:45 | POST CARD | JPEG | 2222 | | – | – | – |
| 3 | 11/27/2018 10:00 | PHOTOGRAPHIC PRINT SIZE L | JPEG | 3333 | 3344 LBA | 3455 DAT | ~~3344 JPG~~ | |
| 4 | 11/27/2018 10:22 | PHOTOGRAPHIC PRINT SIZE L | JPEG | 4444 | | | | |
| 5 | 11/27/2018 10:30 | A4 | PDF | 5555 | | | | 3456 ALL |
| 6 | 11/28/2018 9:32 | A3 | DOC | 6666 | | | | |

FIG. 6

| No. | PRINTING DATA CHARACTERISTICS | | RESERVATION NUMBER | | | | |
|---|---|---|---|---|---|---|---|
| | PRINTING EXPIRATION DATE | PRINT COUNT | INDIVIDUAL | G1 | G2 | G3 | G4 |
| 1 | 12/02/2018 23:59 | 0 | 1111 | 1122N OOUT DL | | | |
| 2 | 12/02/2018 23:59 | 0 | 2222 | | 1233N OOUT | 12345 CLOS EDL | 123456 ALL |
| 3 | 12/03/2018 23:59 | 0 | 3333 | - | | | |
| 4 | 12/03/2018 23:59 | 1 | 4444 | - | - | | |
| 5 | 12/03/2018 23:59 | 1 | 5555 | - | - | | |
| 6 | 12/09/2018 23:59 | 1 | 6666 | - | - | - | |

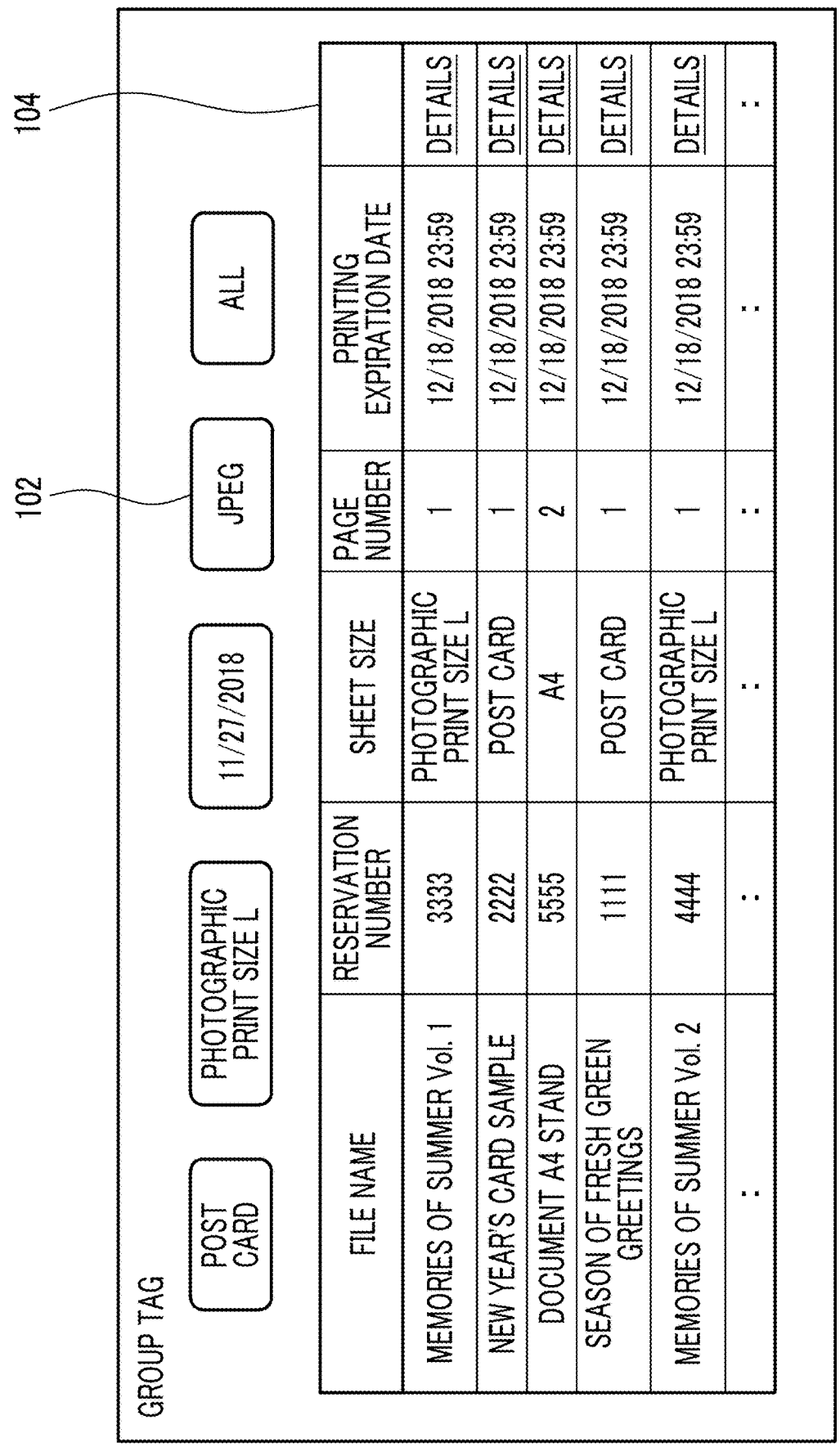

FIG. 7B

| SHEET SIZE | GROUP RESERVATION NUMBER | RESERVATION NUMBER | FILE NAME | PAGE NUMBER | PRINTING EXPIRATION DATE | |
|---|---|---|---|---|---|---|
| PHOTOGRAPHIC PRINT SIZE L | 3344LBA | 3333 | MEMORIES OF SUMMER Vol. 1 | 1 | 12/18/2018 23:59 | DETAILS |
| PHOTOGRAPHIC PRINT SIZE L | | 4444 | MEMORIES OF SUMMER Vol. 2 | 1 | 12/18/2018 23:59 | DETAILS |

FIG. 8A

GROUP TAG

| PRINT SHEET SIZE | REGISTERED TIME AND DATE | FILENAME EXTENSION | ALL |

202
204

| FILE NAME | RESERVATION NUMBER | SHEET SIZE | PAGE NUMBER | PRINTING EXPIRATION DATE | |
|---|---|---|---|---|---|
| MEMORIES OF SUMMER Vol. 1 | 3333 | PHOTOGRAPHIC PRINT SIZE L | 1 | 12/18/2018 23:59 | DETAILS |
| NEW YEAR'S CARD SAMPLE | 2222 | POST CARD | 1 | 12/18/2018 23:59 | DETAILS |
| DOCUMENT A4 STAND | 5555 | A4 | 2 | 12/18/2018 23:59 | DETAILS |
| SEASON OF FRESH GREEN GREETINGS | 1111 | POST CARD | 1 | 12/18/2018 23:59 | DETAILS |
| MEMORIES OF SUMMER Vol. 2 | 4444 | PHOTOGRAPHIC PRINT SIZE L | 1 | 12/18/2018 23:59 | DETAILS |
| ∶ | ∶ | ∶ | ∶ | ∶ | ∶ |

FIG. 8B

| SHEET SIZE | GROUP RESERVATION NUMBER | RESERVATION NUMBER | FILE NAME | PAGE NUMBER | PRINTING EXPIRATION DATE | |
|---|---|---|---|---|---|---|
| POST CARD | 1122HAG | 1111 | SEASON OF FRESH GREEN GREETINGS | 1 | 12/18/2018 23:59 | DETAILS |
| POST CARD | | 2222 | NEW YEAR'S CARD SAMPLE | 1 | 12/18/2018 23:59 | DETAILS |
| PHOTOGRAPHIC PRINT SIZE L | 3344LBA | 3333 | MEMORIES OF SUMMER Vol. 1 | 1 | 12/18/2018 23:59 | DETAILS |
| PHOTOGRAPHIC PRINT SIZE L | | 4444 | MEMORIES OF SUMMER Vol. 2 | 1 | 12/18/2018 23:59 | DETAILS |
| A4 | — | 5555 | DOCUMENT A4 STAND | 2 | 12/18/2018 23:59 | DETAILS |
| .. | .. | .. | .. | .. | .. | .. |

204

MANAGEMENT APPARATUS AND TERMINAL APPARATUS

CROSS-REFERENCE TO RELATED APPLICATIONS

This application is based on and claims priority under 35 USC 119 from Japanese Patent Application No. 2019-069741 filed Apr. 1, 2019.

BACKGROUND

(i) Technical Field

The present invention relates to a management apparatus and a terminal apparatus.

(ii) Related Art

There is a system that performs printing processing by registering printing data of a user in a server (also referred to as a management apparatus) and accessing the server from a printing apparatus provided in a store or the like to download the printing data of the user to the printing apparatus (for example, refer to JP2008-117349A). In such a system, first, the user registers printing data in the server from a terminal apparatus such as a personal computer (PC) and a smartphone, and the server generates identification information for each piece of the registered printing data. The user performs printing processing by going to the store in which the printing apparatus is provided, inputting identification information corresponding to printing data that the user wants to print to the printing apparatus, and downloading the printing data identified by the identification information from the server to the printing apparatus.

SUMMARY

In a case of printing a plurality of printing data pieces registered beforehand with the printing apparatus, it is necessary for the user to input identification information for each piece of printing data to the printing apparatus, which takes effort.

Aspects of non-limiting embodiments of the present disclosure relate to a management apparatus and a terminal apparatus that can make processes for a user easier than inputting identification information corresponding to each piece of printing data in a case of printing a plurality of printing data pieces registered beforehand with a printing apparatus.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a management apparatus including a registration section that registers a plurality of pieces of printing data related to a printing request by a user based on data received from a terminal apparatus of the user, a generation section that groups printing data which has identical or similar printing data characteristics to generate group identification information, a receiving section that receives the group identification information from a printing apparatus, and a providing section that provides the printing apparatus with the plurality of pieces of printing data which belong to a group identified by the group identification information received by the receiving section.

BRIEF DESCRIPTION OF THE DRAWINGS

Exemplary embodiment(s) of the present invention will be described in detail based on the following figures, wherein:

FIG. 4A is a table for describing generation and change of a group accompanying the registration of the printing data;

FIG. 4B is a table for describing the generation and change of the group accompanying the registration of the printing data;

FIG. 4C is a table for describing the generation and change of the group accompanying the registration of the printing data;

FIG. 4D is a table for describing the generation and change of the group accompanying the registration of the printing data;

FIG. 4E is a table for describing the generation and change of the group accompanying the registration of the printing data;

FIG. 4F is a table for describing the generation and change of the group accompanying the registration of the printing data;

FIG. 5 is a table for describing update of the group accompanying the printing of the printing data;

FIG. 6 is a table for describing grouping of the printing data based on a printing expiration date and a print count;

FIG. 7A is a table showing an example of a registered printing data check screen of a terminal apparatus;

FIG. 7B is a table showing an example of a display screen in a case where a tag is pressed on the check screen of FIG. 7A;

FIG. 8A is a table showing another example of the registered printing data check screen of the terminal apparatus; and FIG. 8B is a table showing an example of the display screen in a case where the tag is pressed on the check screen of FIG. 8A.

DETAILED DESCRIPTION

Hereinafter, an exemplary embodiment of the present invention will be described in detail with reference to the accompanying drawings. A configuration to be described below is an example for description, and can be changed as appropriate in accordance with specifications of a printing system. In a case where a plurality of exemplary embodiments or modification examples are included in the following, features of the exemplary embodiments or the modification examples are assumed in the first place to be used in combination as appropriate.

Figure 1:
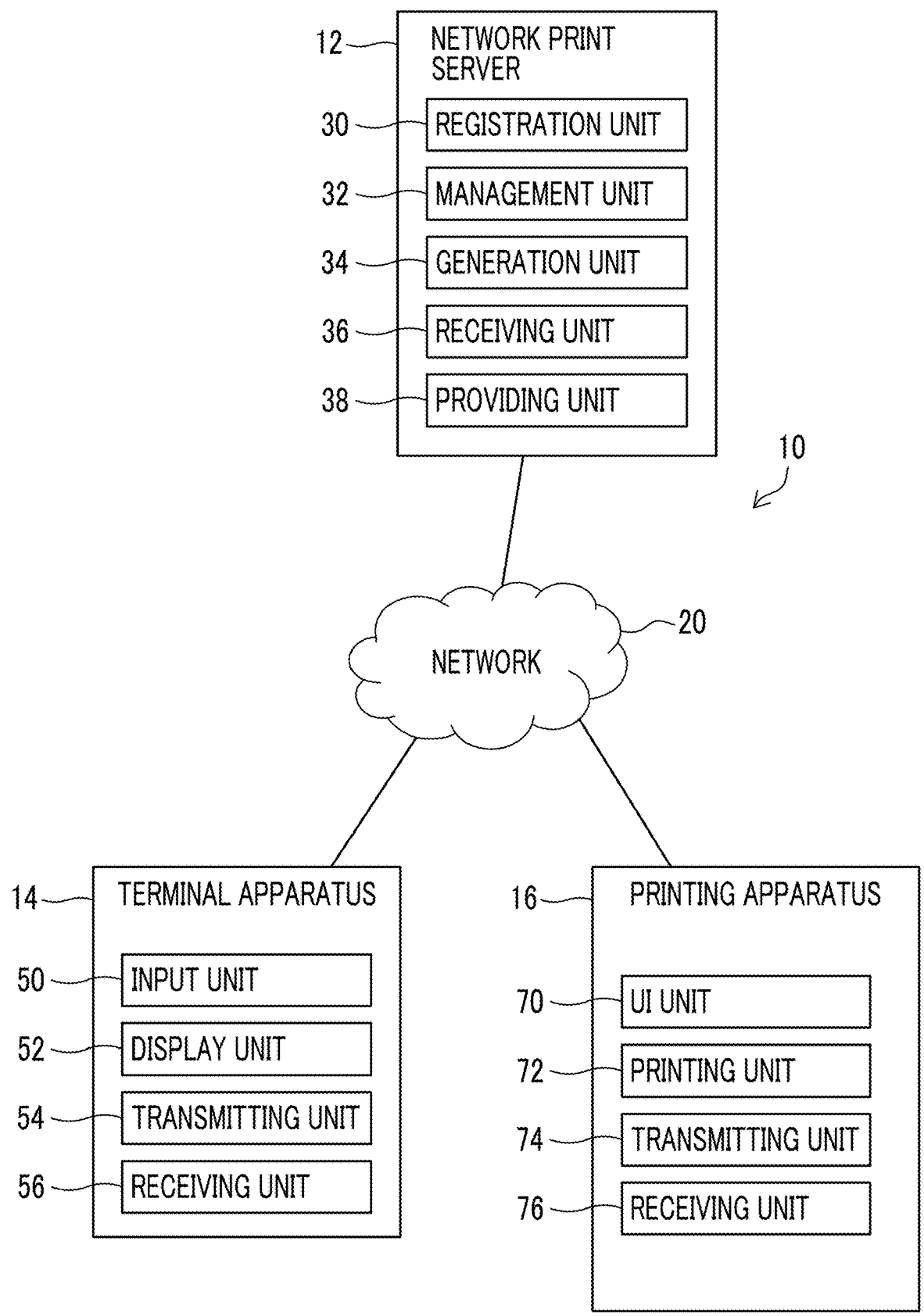
FIG. 1 is a diagram showing a configuration of a printing system.

FIG. 1 is a diagram showing an example of a configuration of a printing system 10 according to the exemplary embodiment. The printing system 10 includes a terminal apparatus 14 for a user, a printing apparatus 16, such as a multi-function printer provided in a convenience store, and a network print server 12 (also referred to as a management apparatus) connected to the terminal apparatus 14 and the printing apparatus 16 via a network 20. The network 20 is the Internet or the like.

The terminal apparatus 14 is for uploading data that the user wants to print with the printing apparatus 16 to the network print server 12, and examples thereof include a smartphone, a tablet device, and a personal computer (PC). The network print server 12 is a server that provides a network printing service, and is a server that stores data uploaded from the terminal apparatus 14 via the network 20 and provides the printing apparatus 16 with the stored data via the network 20 in response to a request from the printing apparatus 16. The printing apparatus 16 is a printing apparatus that provides the network printing service, and is a printing apparatus that downloads and prints the data stored in the network print server 12 in accordance with a printing instruction from the user.

The terminal apparatus 14 has an input unit 50, a display unit 52, a transmitting unit 54, and a receiving unit 56. The input unit 50 is a keyboard, a mouse, or a touch panel, and the display unit 52 is a display (including a touch panel). The input unit 50, the display unit 52, the transmitting unit 54, and the receiving unit 56 function as an input section, a display section, a transmitting section, and a receiving section, respectively.

The printing apparatus 16 can also be referred to as an image forming apparatus or an image processing apparatus, and has a UI unit 70, a printing unit 72, a transmitting unit 74, and a receiving unit 76. The UI unit 70 is an operation button or a touch panel, the printing unit 72 is a device that performs printing onto a sheet through an electrophotographic system or an ink jet system. The UI unit 70, the printing unit 72, the transmitting unit 74, and the receiving unit 76 function as an input and output section, a printing section, a transmitting section, and a receiving section, respectively.

As will be described later, by registering printing data from the terminal apparatus 14 to the network print server 12, the network print server 12 assigns each piece of printing data with a reservation number (also referred to as identification information), and assigns a plurality of printing data pieces with an identical group reservation number (also referred to as group identification information). In the present disclosure, the "number" includes not only numerals but also alphabetic letters and symbols. The user inputs a reservation number or a group reservation number, which corresponds to printing data intended to be printed, to the printing apparatus 16 via the UI unit 70, and downloads one or a plurality of printing data pieces identified by the reservation number or the group reservation number to the printing apparatus 16 from the network print server 12, thereby causing the printing unit 72 to perform printing processing.

The network print server 12 has a registration unit 30, a management unit 32, a generation unit 34, a receiving unit 36, and a providing unit 38.

The registration unit 30 receives registration of printing data related to a printing request by the user based on data received from the terminal apparatus 14 of the user. Specifically, the registration unit 30 provides the terminal apparatus 14 with a UI screen for printing data registration as, for example, a web page, and receives a file designated on the UI screen by the user and additional information such as print setting for the file. Then, after making printing data by combining the file and the additional information, the registration unit 30 registers the printing data in the management unit 32. Alternatively, the registration unit 30 associates the printing data with additional information, with the file as the printing data, and registers the associated data in the management unit 32. Hereinafter, description will be given under an assumption that printing data and additional information are associated with each other and then are registered in the management unit 32. In a case of registering printing data and additional information in the management unit 32, the registration unit 30 also associates a reservation number for identifying printing data, which is issued by the generation unit 34, with the printing data, and registers the associated data.

The management unit 32 is a database that stores information such as registered printing data. The management unit 32 manages printing data for each user.

In a case of registering printing data, the generation unit 34 issues one reservation number for one piece of printing data, and notifies the user of the reservation number. In addition, the registration unit 30 correlates the reservation number with the printing data, and registers the correlated data in the management unit 32.

In addition, out of a plurality of printing data pieces that are obtained by combining one or a plurality of printing data pieces to be registered most recently or registered most recently with printing data which has been registered in the management unit 32 from the past, the generation unit 34 groups printing data pieces that have an identical or similar characteristic and generates a group reservation number. Specifically, the generation unit 34 generates one group reservation number for a plurality of printing data pieces having an identical or similar characteristic, and correlates the group reservation number with the plurality of printing data pieces so as to be registered in the management unit 32, thereby associating the printing data. For example, as shown in FIG. 4B, in a case where filename extensions of printing data No. 1 and printing data No. 2 are the same, which is JPEG, grouping is performed by associating "1122JPG", which is a group reservation number, with the printing data No. 1 and the printing data No. 2. In a column written "individual" in FIG. 4B, reservation numbers of the printing data No. 1 and the printing data No. 2 are written. In a case of generating a group reservation number, the generation unit 34 notifies the user of the group reservation number.

Referring back to FIG. 1, the receiving unit 36 of the network print server 12 receives a reservation number or a group reservation number transmitted from the printing apparatus 16 in response to a request from a user who operates the printing apparatus 16.

The providing unit 38 reads printing data and additional information, which are correlated with a reservation number received by the receiving unit 36, from the management unit 32, and provides the printing apparatus 16 with the read data and information via the network 20. In addition, the providing unit 38 reads a plurality of printing data pieces and additional information thereof, which are correlated with a group reservation number received by the receiving unit 36, from the management unit 32, and provides the printing apparatus 16 with the read data and information via the network 20.

Next, an operation of the printing system 10 of the exemplary embodiment, which is configured as described above, will be described.

Figure 2:
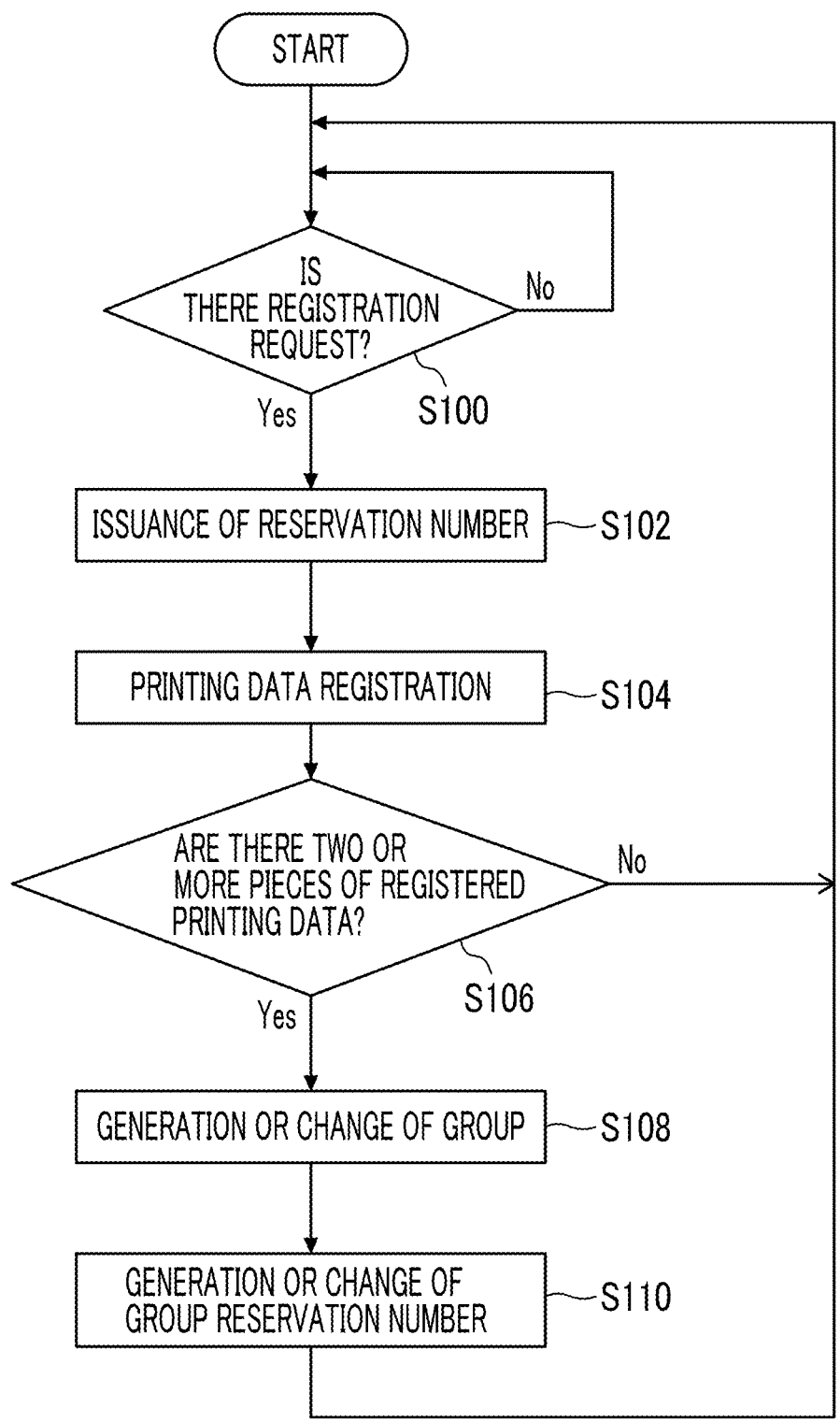
FIG. 2 is a flow chart showing the flow of processing when registering printing data.

FIG. 2 is a flow chart showing the flow of processing of the network print server 12 when registering printing data. The user accesses the network print server 12 from the terminal apparatus 14 via the network 20. Then, on a printing data registration screen (for example, a web page) provided from the network print server 12, the user designates a file, and designates print setting (print sheet size and the like) or a password. Accordingly, the file and additional information (print setting, a password, and the like) are transmitted from the terminal apparatus 14 to the network print server 12, and a registration request is generated (S100 of FIG. 2: Yes). The generation unit 34 of the network print server 12 assigns the file and the additional information with a unique reservation number (S102). The registration unit 30 of the network print server 12 associates the reservation number with the file (printing data) and the additional information, and registers the associated data in the management unit 32 (S104). In addition, the network print server 12 transmits the reservation number to the terminal apparatus 14 of the user. The reservation number may be transmitted to an email address input by the user on the web page.

Next, in S106 of FIG. 2, the network print server 12 checks whether there are two or more pieces of registered printing data. In a case where there are less than two (S106: No), the network print server stands by for the next printing data registration. In a case where there are two or more (S106: Yes), processing proceeds to S108.

In S108 and S110, the network print server 12 performs at least one of generation or change of a group to which a plurality of printing data pieces belong, and subsequently performs at least one of generation or change of a group reservation number. Hereinafter, the operation will be described with reference to an example shown in FIGS. 4A to 4F. In FIGS. 4A to 4F and FIGS. 5 and 6, which are to be described later, the column of "No." means printing data, the column of "individual" means a reservation number of printing data, and each of columns of "G1, G2, G3, and G4" means a "group reservation number". Hereinafter, each piece of printing data will be expressed as No. 1, No. 2, and the wording "printing data" will be omitted in some cases. In addition, parameters such as registered time and date in "printing data characteristics" shown in each drawing are information included in printing data or additional information thereof. "Registered time and date" means registered time and date of printing data, "sheet size" means a print sheet size, and "filename extension" means a filename extension of a file uploaded by the user.

As shown in FIG. 4A, the generation unit 34 does not generate a group reservation number at a stage where one piece of printing data (No. 1) is registered in the management unit 32. In FIG. 4A, the generation unit 34 issues the reservation number "1111" for No. 1.

Next, as shown in FIG. 4B, the generation unit 34 groups printing data pieces at a stage where a second piece of printing data (No. 2) is registered in the management unit 32 (S106 of FIG. 2: Yes). In the exemplary embodiment, by focusing on having an identical or similar printing data characteristic, a group (also referred to as a characteristic group) is generated by grouping printing data, and a group (also referred to as an all-inclusive group) that includes all printing data pieces is generated. However, in a case where a characteristic group that includes all printing data pieces is generated, an all-inclusive group is not additionally generated. However, even in a case where a characteristic group that includes all printing data pieces is generated, an all-inclusive group may be additionally generated as another exemplary embodiment.

In FIG. 4B, the generation unit 34 issues the reservation number "2222" for No. 2. The generation unit 34 tries generating a characteristic group by focusing on the fact that characteristics of No. 1 and No. 2 are identical or similar to each other. Herein, the generation unit 34 generates a characteristic group formed of No. 1 and No. 2 and generates the group reservation number "1122JPG" by focusing on the fact that filename extensions of No. 1 and No. 2 are JPEG. The group reservation number "1122JPG" is associated with No. 1 and No. 2, and is registered in the management unit 32. In addition, the group reservation number "1122JPG" and information indicating that No. 1 and No. 2 belong to a group identified by this group reservation number are transmitted to the terminal apparatus 14 of the user. The information may be transmitted to an email address input by the user on the web page. Since the characteristic group (1122JPG) that includes all printing data pieces is generated in FIG. 4B, an all-inclusive group is not additionally generated.

Herein, as is clear from the group reservation number "1122JPG", the group reservation number includes at least a part of each of the reservation numbers (1111 and 2222) of the printing data pieces (No. 1 and No. 2) that belong to the group. In addition, as is clear from the group reservation number "1122JPG", the group reservation number includes an expression indicating a characteristic common to the plurality of printing data pieces that belong to the group. Herein, the group reservation number "1122JPG" includes an expression (JPG) indicating "JPEG", which is a characteristic common to No. 1 and No. 2.

Next, as shown in FIG. 4C, the generation unit 34 performs at least one of generation of a new group of printing data or change of the existing group at a stage where a third piece of printing data (No. 3) is registered in the management unit 32.

In FIG. 4C, the generation unit 34 issues the reservation number "3333" for No. 3. By focusing on the fact that filename extensions of No. 1 to No. 3 are identical to each other, which are JPEG, the generation unit 34 makes a change of adding No. 3 to the existing group ("1122JPG" of FIG. 4B), and changes the group reservation number from "1122JPG" to "1233JPG" (including at least a part of each of reservation numbers of No. 1 to No. 3 that belong to the group). In addition, the generation unit 34 generates a group formed of No. 1 and No. 2 and generates the group reservation number "1122HAG" by focusing on the fact that sheet sizes of No. 1 and No. 2 are identical to each other, which is "post card". The group reservation number "1122HAG" includes the expression "HAG" indicating "post card", which is a characteristic common to No. 1 and No. 2. Since a characteristic group (1233JPG) that includes all printing data pieces is generated in FIG. 4C, an all-inclusive group is not additionally generated. The group reservation number "1233JPG" is associated with No. 1 to No. 3, the group reservation number "1122HAG" is associated with No. 1 and No. 2, and the associated information pieces are registered in the management unit 32. In addition, the user is notified of the group reservation number "1233JPG" and information indicating that No. 1 to No. 3 belong to the group identified by the group reservation number. Similarly, the user is notified of the group reservation number "1122HAG" and information indicating that No. 1 and No. 2 belong to the group identified by the group reservation number.

In FIGS. 4D to 4F, grouping in a case where printing data is being registered and increased piece by piece is shown, and at least one of generation of a new group of printing data or change of the existing group is performed as in FIG. 4C.

In FIG. 4D, the generation unit 34 issues the reservation number "4444" for No. 4 which is newly added to FIG. 4C. By focusing on the fact that filename extensions of No. 1 to No. 4 are identical to each other, which are JPEG, the generation unit 34 makes a change of adding No. 4 to the existing group ("1233JPG" of FIG. 4C), and changes the group reservation number from "1233JPG" to "1234JPG" (including at least a part of each of reservation numbers of No. 1 to No. 4 that belong to the group). In addition, the generation unit 34 generates a group formed of No. 3 and No. 4 and generates the group reservation number "3344LBA" by focusing on the fact that sheet sizes of No. 3 and No. 4 are identical to each other, which is a "photographic print size L". The group reservation number "3344LBA" includes the expression "LBA" indicating the "photographic print size L", which is a characteristic common to No. 3 and No. 4. Since the characteristic group (1234JPG) that includes all printing data pieces is generated in FIG. 4D, an all-inclusive group is not additionally generated.

Next, in FIG. 4E, the generation unit 34 issues the reservation number "5555" for No. 5 which is newly added to FIG. 4D. The generation unit 34 generates a group formed of No. 3 to No. 5 and generates the group reservation number "3455DAT" by focusing on the fact that entries of registered time and date of No. 3 to No. 5 are identical to each other, which is "Nov. 27, 2018". In addition, since a characteristic group that includes all printing data pieces (No. 1 to No. 5) does not exist, the generation unit 34 generates an all-inclusive group formed of No. 1 to No. 5 and generates the group reservation number "12345ALL".

Next, in FIG. 4F, the generation unit 34 issues the reservation number "6666" for No. 6 which is newly added to FIG. 4E. Herein, since there is no identical or similar characteristic between No. 6 and No. 1 to No. 5, the generation unit 34 does not generate a new group. The generation unit 34 makes a change of adding No. 6 to the all-inclusive group ("12345ALL" of FIG. 4E), and changes the group reservation number from "12345ALL" to "123456ALL" (including at least a part of each of reservation numbers of No. 1 to No. 6 that belong to the group).

Figure 3:
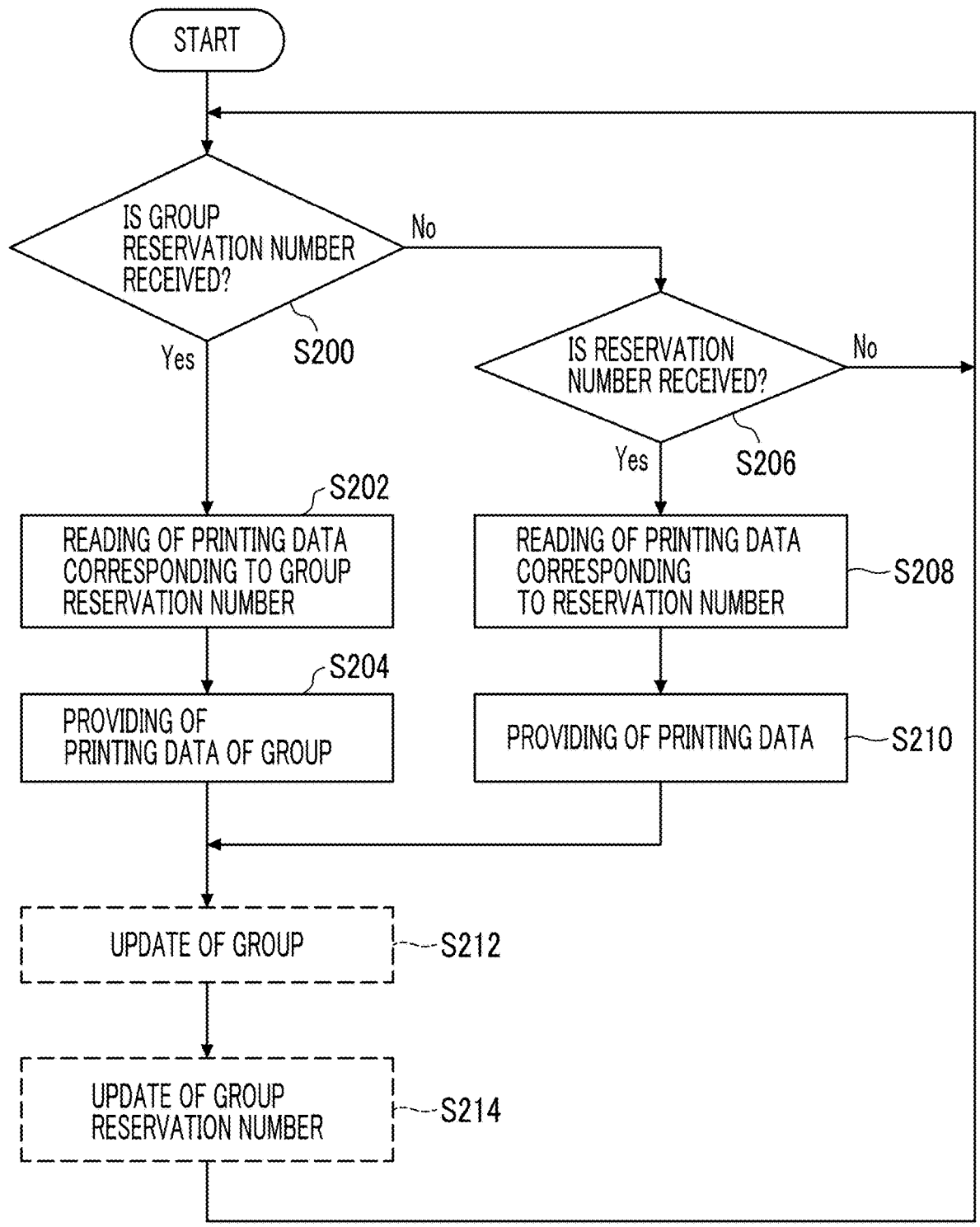
FIG. 3 is a flow chart showing the flow of processing when printing the printing data.

Next, an operation of the printing system in a case where the printing apparatus 16 prints printing data registered in the network print server 12 in this manner will be described. FIG. 3 is a flow chart showing the flow of processing of the network print server 12 when printing printing data.

First, the user goes to a convenience store or the like, in which the printing apparatus 16 corresponding to the network printing service is provided. The user calls up the network printing service from a menu screen displayed on the UI unit 70 of the printing apparatus 16, and inputs a group reservation number or a reservation number. Then, the transmitting unit 74 of the printing apparatus 16 accesses the network print server 12, and transmits the group reservation number or the reservation number input by the user. The receiving unit 36 of the network print server 12 receives the number (S200: Yes or S206: Yes of FIG. 3).

In a case where the group reservation number is received (S200: Yes), the providing unit 38 of the network print server 12 reads a plurality of printing data pieces associated with the group reservation number and additional information thereof from the management unit 32 (S202), and transmits the printing data and the additional information to the printing apparatus 16 (S204). Then, the receiving unit 76 of the printing apparatus 16 receives the plurality of printing data pieces and the additional information thereof. In a case where a print start button, which is a part of the UI unit 70, is pressed by the user, the printing unit 72 of the printing apparatus 16 prints out each piece of printing data while using print setting included in each piece of additional information.

In addition, in a case where the reservation number is received (S206: Yes), the providing unit 38 of the network print server 12 reads the printing data and the additional information associated with the reservation number from the management unit 32 (S208), and transmits the printing data and the additional information to the printing apparatus 16 (S210). Then, the receiving unit 76 of the printing apparatus 16 receives the printing data and the additional information. In a case where the print start button is pressed by the user, the printing unit 72 of the printing apparatus 16 prints out the printing data while using print setting included in the additional information.

In a case where the user sets a password on the printing data registration screen (web page), the user also inputs a password when inputting the group reservation number or the reservation number to the printing apparatus 16. The network print server 12 receives the group reservation number or the reservation number and the password, reads additional information of printing data corresponding to the group reservation number or the reservation number from the management unit 32, checks whether or not a password (password designated at the time of registration) included in the additional information and a password received from the printing apparatus 16 match each other, and provides the printing apparatus 16 with the printing data and the additional information only in a case where the passwords match each other.

As shown in FIG. 3, after the network print server 12 has provided the printing data (after S204 or S210), the network print server 12 may update a group of the printing data and subsequently update the group reservation number. The update will be described in detail later.

In addition, in the exemplary embodiment described above, the generation unit 34 of the network print server 12 generates a plurality of group reservation numbers which have different combinations of printing data pieces with respect to one piece of printing data in a case where a plurality of groups to which one piece of printing data belongs can be created. For example, with respect to the printing data of No. 4 shown in FIG. 4F, four group reservation numbers (3344LBA, 3455DAT, 1234JPG, and 123456ALL), which have different combinations of printing data pieces, are generated. In a case where a plurality of groups, which have different combinations of printing data pieces, are generated with respect to one piece of printing data as described above, it is also possible to see that each group is stratified according to the number of printing data pieces that belong to each group. Specifically, a group having a larger number of printing data pieces that belong to the group is seen as a higher level group.

In the exemplary embodiment described above, each time printing data pieces that belong to a group change (for example, each time new printing data is added to the group), a group reservation number is changed. However, a form in which a group reservation number is not changed even in a case where printing data pieces that belong to a group changes may be adopted.

A configuration where after a group is automatically generated as described above, the user can change printing data pieces that belong to the group via the terminal apparatus 14, or change a group reservation number may be adopted. In addition, the user may manually select a plurality of reservation numbers and generate a group via the terminal apparatus 14.

A plurality of printing data pieces having identical or similar characteristics are grouped and a group reservation number is generated. However, the "characteristic" (that is, a key in a case of grouping) of this case can cause generation of a group, which has a combination of printing data pieces intended by the user. For example, in a case where printing data pieces having similar registered time and date are recklessly grouped, there is also a possibility that the group does not have the combination of printing data pieces intended by the user. For this reason, removing registered time and date as a key in a case of grouping is also considered. Hereinafter, examples considered to be effective as keys in a case of grouping will be given. The key in a case of grouping is not limited to keys described in the following.

(1) Print Setting

Print setting is used as a key (characteristic) in a case of grouping printing data. For example, a plurality of printing data pieces having identical or similar print sheet sizes (A4, A3, B4, B5, post card, size L (photo), and the like) are grouped. The print sheet size is information included in additional information of printing data, for example, by the user designating a size on the UI screen for printing data registration (web page) from the terminal apparatus 14, or by the terminal apparatus 14 or the network print server 12 automatically designating a size. The same applies to a color mode, a printing direction, a password, a printing expiration date, and a registration channel, which are to be described later.

For example, printing data pieces having an identical printing direction (vertical or horizontal) are grouped. For example, a plurality of printing data pieces having identical or similar color modes (full-color, grayscale, and black and white) are grouped. In addition, for example, a plurality of printing data pieces in which passwords are set are grouped, and a plurality of printing data pieces in which passwords are not set are grouped. Alternatively, a plurality of printing data pieces in which an identical password is set are grouped. In a case where a plurality of printing data pieces in which an identical password is set are grouped as described above and one group reservation number is generated, it is also possible to print the plurality of printing data pieces by the user inputting the group reservation number and the password just once to the printing apparatus 16 (an effort of inputting a password for each piece of printing data over and over becomes unnecessary).

(2) Printing Expiration Date

In addition, the plurality of printing data pieces of which printing expiration dates are close are grouped. The printing expiration date is an expiration date by which the user can print printing data with the printing apparatus 16, and is information included in additional information of the printing data by the user designating a date on the UI screen for printing data registration or by the terminal apparatus 14 or the network print server 12 automatically designating a date. For example, the generation unit 34 groups printing data pieces having one day or several days left from a printing expiration date, and generates a group reservation number.

(3) Registration Channel

In addition, printing data pieces having identical or similar registration channels are grouped. There is a possibility that printing data is registered from a UI screen provided by the government and a UI screen provided by a private enterprise in addition to the UI screen for printing data registration (web page) provided by the network print server 12 described above. That is, there is a possibility that printing data is registered from various application services. The registration channel refers to an application service through which the user registers a file. By grouping printing data pieces having identical or similar registration channels as described above, for example, a possibility that printing data for personal use and printing data for business use are divided and grouped increases.

(4) File Name and File Content

Printing data pieces having identical or similar filename extensions of registered files are grouped. In addition, printing data pieces having similar file names of registered files are grouped. For example, since the filename "Memories of Summer Vol. 1" and the file name "Memories of Summer Vol. 2" are similar to each other, the printing data pieces are grouped. A known technique of the related art can be adopted for determination as to whether or not file names are similar to each other. In addition, printing data pieces having similar registered file content are grouped. For example, grouping is performed according to an image (a human, scenery, and an animal) in a file or similarity between sentences in a file. A known technique of the related art can be adopted for determination as to whether or not file content is similar.

Next, update of a group of printing data and subsequent update of a group reservation number will be described. As described above, although generation and change of a group and subsequent generation and change of a group reservation number are performed in a case of registering printing data, the group and the group reservation number may be updated at a timing when the printing apparatus 16 prints printing data. In addition, the group and the group reservation number may be updated at a time interval determined in advance or at a point of time determined in advance. Herein, the update of a group includes generation, elimination, and change of a group, and similarly, the update of a group reservation number includes generation, elimination, and change of a group reservation number. First, the update of a group and a group reservation number in a case where the printing apparatus 16 has printed printing data will be described.

As shown in FIG. 3, after the network print server 12 has provided the printing apparatus 16 with printing data in S204 or S210, the generation unit 34 of the network print server 12 updates a group of the printing data and subsequently updates the group reservation number in S212 and S214. After receiving a printing data printing processing completion notification from the printing apparatus 16, the generation unit 34 of the network print server 12 may update the group of the printing data and subsequently update the group reservation number.

The user becomes less interested in printing data printed by the user with the printing apparatus 16, and the printing data has a possibility of being printed compared to other printing data. Thus, in the exemplary embodiment described herein, printing data pieces, excluding printed printing data, are grouped again, and a group reservation number is updated.

FIG. 5 is a table showing a state where a group is updated and subsequently a group reservation number is updated after the printing data of No. 1 and the printing data of No. 2, out of grouped printing data pieces as in FIG. 4F, are printed. First, the network print server 12 stores the reservation numbers of No. 1 and No. 2, which are provided by the printing apparatus 16, or the group reservation number (1122HAG) of the group formed of No. 1 and No. 2, which is provided by the printing apparatus. Alternatively, the network print server 12 acquires, from the printing apparatus 16, the reservation numbers of printed No. 1 and No. 2 or the printed group reservation number (1122HAG) of the group formed of No. 1 and No. 2.

Then, the generation unit 34 of the network print server 12 eliminates the group "1122HAG" formed of the printed No.

1 and No. 2 by using the reservation numbers of the printed No. 1 and No. 2 or the group reservation number (1122HAG), and excludes No. 1 and No. 2 from the group "1234JPG" (refer to FIG. 4F) and the group "123456ALL" (refer to FIG. 4F), to which No. 1 and No. 2 belong, to change to the group "3344JPG" (refer to FIG. 5) and the group "3456ALL" (refer to FIG. 5).

Herein, as shown in FIG. 5, printing data pieces that belong to the group "3344JPG" are No. 3 and No. 4, and similarly, printing data pieces that belong to the group "3344LBA" are No. 3 and No. 4. As described above, two groups having the same combination of printing data pieces exist. Thus, in the exemplary embodiment, processing of eliminating one group ("3344JPG" in FIG. 5) is further performed such that there are not two groups having the same combination of printing data pieces. Although a configuration where two groups having the same combination of printing data pieces do not exist as described above is adopted in the exemplary embodiment, two or more groups having the same combination of printing data pieces may exist as another exemplary embodiment. Specifically, the update of a group and a group reservation number described above is performed by updating a group reservation number correlated with each piece of printing data in the management unit 32 of the network print server 12.

Next, the update of a group and a group reservation number, which is performed at a time interval determined in advance or at a point of time determined in advance, will be described. There is a possibility that the user wants to print after dividing into printing data of which a printing expiration date is close and unprinted printing data. Thus, at a time interval determined in advance or at a point of time determined in advance, the generation unit 34 of the network print server 12 may group printing data pieces of which printing expiration dates are within a predetermined period and generate a group reservation number. At a time interval determined in advance or at a point of time determined in advance, the generation unit 34 of the network print server 12 may group unprinted printing data pieces and generate a group reservation number. In addition, the generation unit 34 of the network print server 12 may group printing data pieces, which are unprinted printing data pieces and of which time left until a printing expiration date that is equal to or less than predetermined time, and generate a group reservation number. FIG. 6 shows a specific example thereof.

As shown in FIG. 6, additional information correlated with printing data that is in the management unit 32 of the network print server 12 can include printing data characteristics such as a "printing expiration date" and a "print count". The "print count" in the additional information can be updated by, for example, the network print server 12 receiving a notification of print completion of each piece of printing data from the printing apparatus 16.

In FIG. 6, the generation unit 34 of the network print server 12 groups printing data pieces of which printing expiration dates are before "Dec. 3, 2018" and generates the group reservation number "12345CLOSEDL". In addition, the generation unit 34 groups printing data pieces of which print counts are 0 (unprinted) and generates the group reservation number "1233NOOUT". The generation unit 34 groups printing data pieces, of which print counts are 0 (unprinted) and printing data pieces of which time left until a printing expiration date is equal to or less than 24 hours, and generates the group reservation number "1122NOOUTDL". The generation of a group described above is performed specifically by associating with each piece of printing data in the management unit 32 of the network print server 12 and storing the generated group reservation number.

Herein, although the generation unit 34 of the network print server 12 generates a group and a group reservation number as described above at a time interval determined in advance or at a point of time determined in advance, the generation unit may generate a group and a group reservation number as described above at a stage where certain printing data is registered or at a stage where certain printing data is printed by the printing apparatus.

Next, a registered printing data check screen of the terminal apparatus 14 will be described. FIG. 7A is a table showing an example of the registered printing data check screen of the terminal apparatus 14. The transmitting unit 54 of the terminal apparatus 14 transmits a request of providing information for displaying the registered printing data check screen in the terminal apparatus 14 to the network print server 12. In response to the request, the network print server 12 transmits information of each piece of printing data related to the user to the terminal apparatus 14. The receiving unit 56 of the terminal apparatus 14 receives information of each piece of printing data related to the user from the network print server 12, and the display unit 52 of the terminal apparatus 14 displays the received information of each piece of printing data. As shown in FIG. 7A, the display unit 52 of the terminal apparatus 14 displays a list 104 of the information of each piece of printing data related to the user.

In addition, the receiving unit 56 of the terminal apparatus 14 receives a plurality of group reservation numbers related to the user, a reservation number of each of a plurality of printing data pieces that belong to a group identified by each group reservation number, and common characteristic information indicating a characteristic common to a plurality of printing data pieces that belong to a group identified by each group reservation number. Then, the display unit 52 of the terminal apparatus 14 first displays a tag 102 indicating common characteristic information of each group on the upper side of the screen as shown in FIG. 7A. Herein, the common characteristic information refers to identical or similar characteristics of respective printing data pieces in a group in a case where the printing data pieces are grouped. In FIG. 7A, the "post card", the "photographic print size L", "2018/11/27", the "JPEG", and "all" are shown as common characteristic information of the five groups "1122HAG", "3344LBA", "3455DAT", "1234JPG", and "123456ALL", respectively, which are shown in FIG. 4F.

Then, in a case where any tag 102 is pressed and a group is selected by the user, the terminal apparatus 14 displays a group reservation number of the selected group and a reservation number of a plurality of printing data pieces that belong to the selected group as shown in FIG. 7B. FIG. 7B shows a screen in a case where a tag of the "photographic print size L" shown in FIG. 7A is pressed.

In the configuration, the user learns a characteristic of each group of grouped printing data pieces, a group reservation number of each group, and a reservation number of printing data pieces that belong to each group in an organized state. In addition, as shown in FIG. 7B, along with a group reservation number or instead of a group reservation number, a QR code (registered trademark) 106 indicating a group reservation number may be displayed. By doing so, by holding a reader attached to the printing apparatus 16 toward the QR code 106 displayed by the display unit 52 of the terminal apparatus 14, it is also possible to input a group reservation number to the printing apparatus 16.

FIG. 8A is a table showing another example of the registered printing data check screen of the terminal apparatus 14. The check screen of FIG. 8A displays a tag 202 indicating a key (characteristic) in a case of grouping printing data pieces, instead of the tag 102 indicating common characteristic information on the check screen of FIG. 7A. In a case where any tag 202 is pressed and any key is selected by the user, the display unit 52 of the terminal apparatus 14 displays a group reservation number of a group grouped by the selected key and a reservation number of a plurality of printing data pieces that belong to each group as shown in FIG. 8B. In addition, the display unit 52 of the terminal apparatus 14 also displays printing data pieces, which are not grouped by a selected key, in a sorted state in a list 204. FIG. 8B shows a screen in a case where a tag of the "print sheet size" shown in FIG. 8A is pressed. Also in the configuration, the user learns a characteristic of each group of grouped printing data pieces, a group reservation number of each group, and a reservation number of printing data pieces that belong to each group in an organized state.

A function of each of the network print server 12, the terminal apparatus 14, and the printing apparatus 16, which are described above, is realized by causing a computer internally mounted in each of the network print server 12, the terminal apparatus 14, and the printing apparatus 16 to execute a program. Herein, for example, in terms of hardware, the computer has a circuit configuration where a microprocessor, such as a CPU, a storage device, such as a random access memory (RAM), a read-only memory (ROM), a flash memory, and a hard disk drive (HDD), various types of input and output (I/O) interfaces, and a network interface are connected, for example, via a bus. In addition, a disk drive for reading and/or writing to a portable disk storage medium, such as a CD and a DVD, and a memory reader and writer for reading and/or writing to portable nonvolatile storage media of various standards, such as a flash memory, may be connected to the bus, for example, via an I/O interface. A program, in which processing content of the function described above or a basic function for realizing the function described above is written, is saved in a fixed storage device, such as a hard disk drive, via a storage medium such as a CD and a DVD, or via communication means such as a network, and is installed in a computer. By the program stored in the fixed storage device being read by a RAM and executed by a microprocessor such as a CPU, the function described above is realized.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A management apparatus comprising:
an input-output (I/O) interface; and
a processor coupled to the I/O interface and configured at least to:
register a plurality of pieces of printing data related to one or more printing requests based on data received from one or more terminal apparatuses;
group at least two of the plurality of pieces of the printing data which have identical or similar printing data characteristics to generate group identification information;
control the I/O interface to receive the group identification information from a printing apparatus;
provide the printing apparatus with the plurality of pieces of printing data which belong to a group identified by the group identification information received by the receiving section;
receive the group identification information; and
transmit an instruction to print the at least two pieces of plurality of pieces of printing data corresponding to the group identification information, wherein the group identification information is required for printing any printing data belong to the group.

2. The management apparatus according to claim 1, wherein the processor is further configured to generate multiple groups, each of the multiple groups has a unique group identification information, at least two of the multiple groups have a same piece of printing data but have different combinations of printing data of the plurality of pieces of printing data.

3. The management apparatus according to claim 1, wherein in a case where the registered printing data is printed, the processor is further configured to group the printing data again, excluding the printed printing data, to update the group identification information.

4. The management apparatus according to claim 2, wherein in a case where the registered printing data is printed, the processor is further configured to group the printing data again, excluding the printed printing data, to update the group identification information.

5. The management apparatus according to claim 1, wherein the processor is further configured to generate identification information that identifies the registered printing data, and
generate the group identification information that includes at least a part of identification information of each piece of printing data that belongs to the group.

6. The management apparatus according to claim 5, wherein the processor is further configured to generate the group identification information that includes an expression indicating characteristics common to the plurality of pieces of printing data which belong to the group.

7. The management apparatus according to claim 1, wherein the printing data includes or is associated with a printing expiration date as additional information, and
the processor is further configured to group the printing data, which has the printing expiration date within a predetermined period, to generate the group identification information.

8. The management apparatus according to claim 2, wherein the printing data includes or is associated with a printing expiration date as additional information, and
the processor is further configured to group the printing data, which has the printing expiration date within a predetermined period, to generate the group identification information.

9. The management apparatus according to claim 1, wherein in a case where the registered printing data is printed, the processor is further configured to identify unprinted printing data from the registered printing data, and groups the unprinted printing data to generate the group identification information.

10. The management apparatus according to claim 2, wherein in a case where the registered printing data is printed, the processor is further configured to identify unprinted printing data from the registered printing data, and groups the unprinted printing data to generate the group identification information.

11. The management apparatus according to claim 1, wherein the printing data includes or is associated with a printing expiration date as additional information,
in a case where the registered printing data is printed, the processor is further configured to identify unprinted printing data from the registered printing data, and
processor is further configured to group the printing data, which is the unprinted printing data and of which time left until the printing expiration date is equal to or less than predetermined time, to generate the group identification information.

12. The management apparatus according to claim 2, wherein the printing data includes or is associated with a printing expiration date as additional information,
in a case where the registered printing data is printed, the processor is further configured to identify unprinted printing data from the registered printing data, and
the processor is further configured to group the printing data, which is the unprinted printing data and of which time left until the printing expiration date is equal to or less than predetermined time, to generate the group identification information.

13. The management apparatus according to claim 1, wherein the printing data includes or is associated with print setting information as additional information, and
the processor is further configured to group the printing data that has the identical or similar print setting information to generate the group identification information.

14. The management apparatus according to claim 2, wherein the printing data includes or is associated with print setting information as additional information, and
the processor is further configured to group the printing data that has the identical or similar print setting information to generate the group identification information.

15. A terminal apparatus comprising:
a display, and
a processor coupled to the display configured to:
receive, from the management apparatus according to claim 1, a plurality of pieces of the group identification information, identification information of each of a plurality of pieces of printing data that belong to a group identified by each piece of the group identification information, and common characteristic information that indicates characteristics common to the plurality of pieces of printing data that belong to the group identified by each piece of the group identification information; and
control the display to display the common characteristic information corresponding to each group,
wherein in a case where a group is selected by using the common characteristic information corresponding to each group, the processor is further configured to control the display to display the group identification information of the selected group, and display identification information of a plurality of pieces of printing data that belong to the selected group.

16. A management apparatus comprising:
registration means for registering a plurality of pieces of printing data related to one or more printing requests based on data received from terminal apparatuses;
generation means for grouping at least two of the plurality of pieces of the printing data which have identical or similar printing data characteristics to generate group identification information;
receiving means for receiving the group identification information from a printing apparatus;
providing means for providing the printing apparatus with the plurality of pieces of printing data which belong to a group identified by the group identification information received by the receiving section;
receiving means further for receiving the group identification information; and
transmitting means for transmitting an instruction to print the at least two pieces of plurality of pieces of printing data corresponding to the group identification information, wherein the group identification information is required for printing any printing data belong to the group.

17. The management apparatus according to claim 2, wherein the at least two of the multiple groups are generated based on different printing data characteristics.

18. The management apparatus according to claim 17, wherein the at least two of the multiple groups comprises a first group and a second group, both the first group and the second group comprise the same piece of printing data, and the second group has more printing data than the first group.

* * * * *